United States Patent
Pulley

(10) Patent No.: US 9,664,030 B2
(45) Date of Patent: May 30, 2017

(54) HIGH FREQUENCY INSPECTION OF DOWNHOLE ENVIRONMENT

(71) Applicant: Piezotech, LLC, Indianapolis, IN (US)

(72) Inventor: Gregory Pulley, Berthoud, CO (US)

(73) Assignee: Piezotech LLC, Indianapolis, IN (US)

( * ) Notice: Subject to any disclaimer, the term of this patent is extended or adjusted under 35 U.S.C. 154(b) by 157 days.

(21) Appl. No.: 14/533,706

(22) Filed: Nov. 5, 2014

(65) Prior Publication Data

US 2016/0123132 A1     May 5, 2016

(51) Int. Cl.
*G01V 1/52*     (2006.01)
*E21B 47/00*    (2012.01)
*G01V 1/44*     (2006.01)

(52) U.S. Cl.
CPC ............ *E21B 47/0005* (2013.01); *G01V 1/44* (2013.01); *G01V 1/52* (2013.01)

(58) Field of Classification Search
CPC ............. E21B 47/00; G01V 1/52; G01V 1/44
USPC ....................................................... 324/368
See application file for complete search history.

(56) References Cited

U.S. PATENT DOCUMENTS

| | | | |
|---|---|---|---|
| 3,311,875 A | 3/1967 | Geyer et al. | |
| 4,255,798 A * | 3/1981 | Havira | E21B 47/0005 181/105 |
| 4,788,981 A | 12/1988 | Nagasaki et al. | |
| 4,800,537 A | 1/1989 | Mount, II | |
| 4,805,156 A | 2/1989 | Attali et al. | |
| 4,893,286 A | 1/1990 | Cobb | |
| 5,357,063 A | 10/1994 | House et al. | |
| 5,481,504 A | 1/1996 | Rosenbach et al. | |
| 5,763,773 A * | 6/1998 | Birchak | E21B 47/0005 181/104 |
| 7,835,227 B2 | 11/2010 | Martin | |
| 9,091,790 B2 * | 7/2015 | Caute | G01S 7/003 |
| 2004/0039282 A1* | 2/2004 | Szabo | G01S 7/52046 600/437 |
| 2010/0135117 A1 | 6/2010 | McRory | |
| 2012/0127830 A1 | 5/2012 | Desai | |
| 2014/0015530 A1 | 1/2014 | Miles et al. | |
| 2014/0050046 A1 | 2/2014 | Sinha et al. | |

(Continued)

FOREIGN PATENT DOCUMENTS

EP     00 75 997 A2     4/1983

OTHER PUBLICATIONS

"Full 3D Acoustic Characterization from Axial, Azimuthal, and Radial Sonic Measurements", [online][retrieved on Aug. 12, 2014], Retrieved from: www.slb.com/services/characterization/geomechanics/wireline/sonic_scanner.aspx.

(Continued)

*Primary Examiner* — Son Le
*Assistant Examiner* — Akm Zakaria
(74) *Attorney, Agent, or Firm* — Woodard, Emhardt, Moriarty, McNett & Henry LLP

(57) ABSTRACT

Among other things, there are disclosed embodiments of a well-logging tool that inspects features of the down-hole environment using ultrasonic signals with a frequency in the range of 3-5 MHz. The ultrasonic signals are encoded, and their time-of-flight and amplitude provide information on features of interior surface of the casing on the order of 1 mm, and on the quality of the cement bond behind the casing.

18 Claims, 6 Drawing Sheets

(56) References Cited

U.S. PATENT DOCUMENTS

2014/0056101 A1  2/2014 Vu et al.
2014/0056111 A1* 2/2014 Vu ..................... E21B 47/0005
                                                    367/180

OTHER PUBLICATIONS

"UCI Ultrasonic Casing Imager", Schlumberger, Dec. 2004, [online], Retrieved from: www.slb.com/oilfield.
Abdallah, Dalia et al., "Casing Corrosion Measurement to Extend Asset Life", Oilfield Review, Autumn 2013, vol. 25, No. 3, pp. 18-31.
Ermolov, Vladimir et al., "Analog Pulse Compression System for Real-Time Ultrasonic Non-Destructive Testing", Ultrasonic, 1996, vol. 34, pp. 655-660.
Franco, J.L. Arroyo et al., "Sonic Investigations In and Around the Borehole", Oilfield Review, Spring 2006, pp. 14-33.
Lam, F. et al., "Pulse Compression Techniques in Ultrasonic Non-Destructive Testing", Ultrasonic, May 1976, pp. 111-114.
Lam, F.K., "Microcomputer-based Digital Pulse Compression System for Ultrasonic NDT", Ultrasonics, 1987, vol. 25, pp. 166-171.
Schlumberger, "Vertical and Horizontal Cement Evaluatoin", Powerpoint presentation for Stray Gas Workshop in Pittsburgh, PA, Nov. 6, 2009.
Schlumberger, Hayden R., et al., "Case Studies in Evaluation of Cement with Wireline Logs in a Deep Water Environment", SPWLA 52nd Annual Logging Symposium, May 14-18, 2011.

* cited by examiner

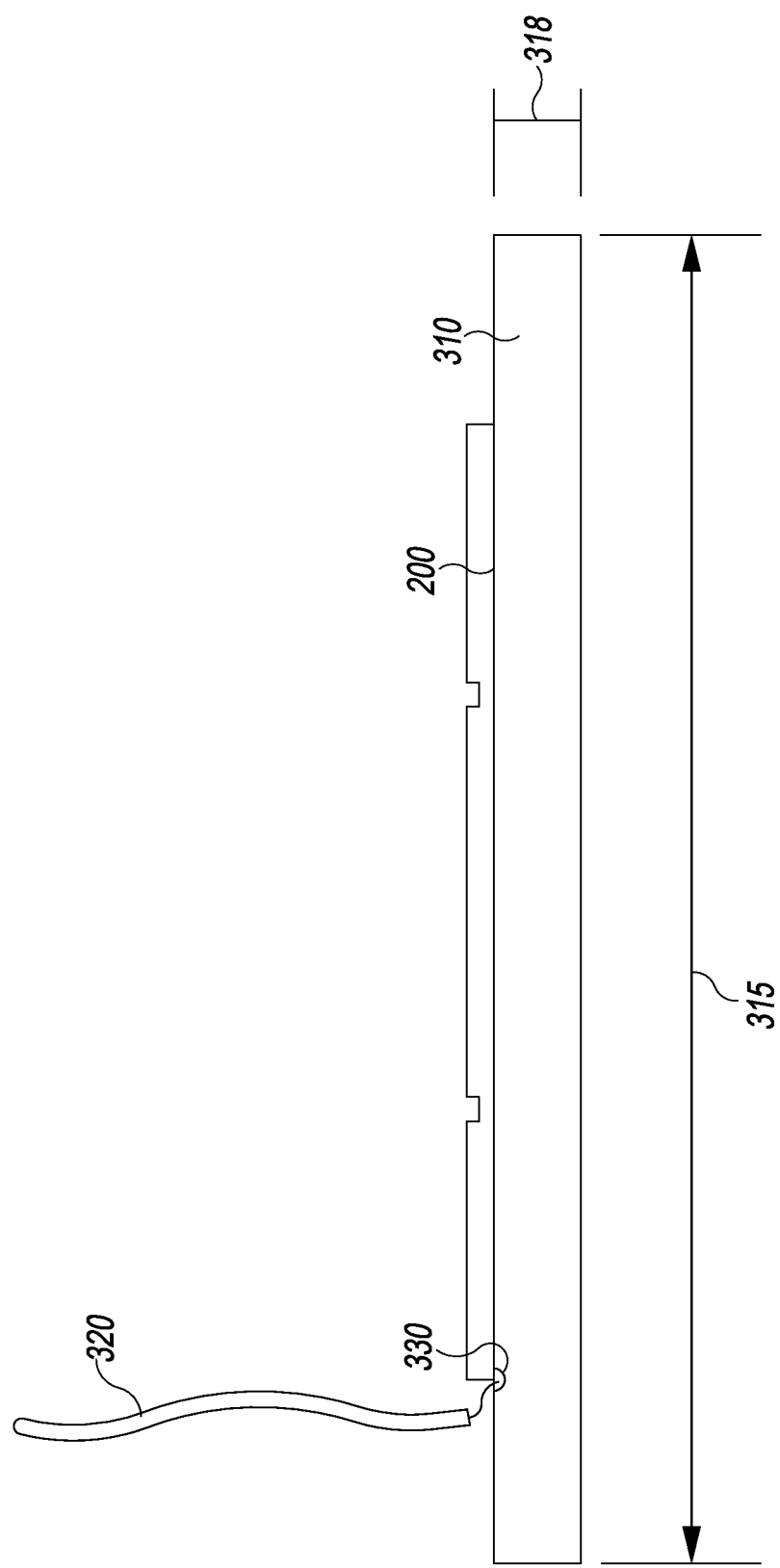

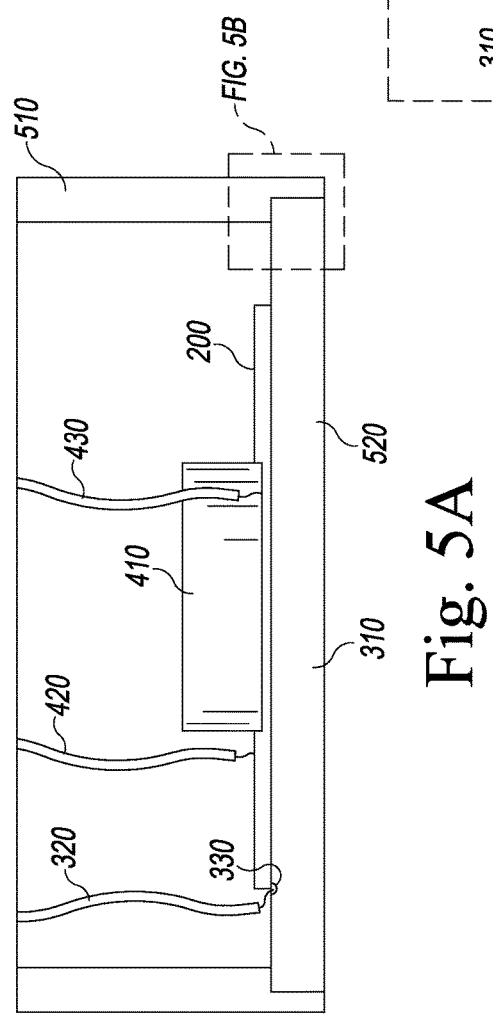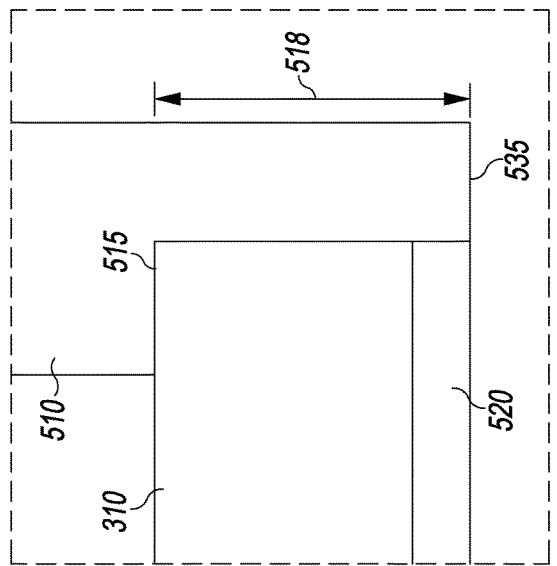
Fig. 5A
Fig. 5B

HIGH FREQUENCY INSPECTION OF DOWNHOLE ENVIRONMENT

The present disclosure relates to high frequency inspection of the downhole environment in a well bore. More particularly, the disclosure relates to tools and methods for inspecting the cement bond quality and casing integrity in an existing well using ultrasound signals on the order of 3-5 MHz.

BACKGROUND

Acoustic inspection is a recognized technology for investigating the down-hole environment in well bores, in both open- and cased-hole environments. Acoustics have been used to investigate cement bond quality for decades (see, e.g., U.S. Pat. No. 4,255,798), but in most applications the frequency range used is on the order of kHz. Higher frequencies allow for superior resolution, but suffer from a number of design constraints that restrict their application in down-hole applications. In view of these constraints, frequencies in the MHz range have only rarely been employed.

The downhole environment presents significant technical challenges for acoustic sensors and their supporting electronics. Modern well bores are routinely 15 kilofeet in depth, and some deeper wells are over 30 kilofeet. These figures reflect typical true depths; the length of the well bore is often significantly greater. Due to the use of directional drilling, for example to exploit a larger area in a field from a single production platform, the well bores are typically not vertical through at least a substantial portion of their length. Thus, the downhole environment presents pressures frequently in excess of 20-30 kPSI, and temperatures frequently in excess of 175-225° C. These conditions make it important to detect even small defects in the casing that lines the well bore. One object of embodiments disclosed herein is to detect pits, gouges, etc., in metallic casing on the order of 1 mm. Another object is to detect defects in the quality of the cement bond behind metallic casing on the order of 1 cm.

The well bore is protected from collapse by approximately maintaining hydrostatic pressure in the well bore with the surrounding environment. The weighted fluid that is typically used to achieve this is generally referred to merely as "mud," but it is actually a carefully engineered fluid that often costs more per barrel than the hydrocarbons that are typically the object of the well. Depending on the demands of the particular drilling project, mud may weigh more than 25 lbs/gals.

What is needed, therefore, is a means to acoustically inspect casing and cement bonds that provides high resolution, yet still operates in high density fluids. Embodiments disclosed herein meet this need.

SUMMARY

Among other things, there are disclosed embodiments of ultrasonic tools and methods for inspecting the down-hole environment in a well using ultrasound on the order of 3-5 MHz. In certain embodiments a well logging tool is disclosed that comprises a housing, at least one transducer, and an electronic controller. The housing is suitable for insertion into a well. The at least one transducer disposed within the housing and suitable for transmitting ultrasonic signals having a bandwidth greater than 3 MHz and a center frequency greater than about 2.5 HMz into the fluid surrounding the well logging tool while the well logging tool is disposed within the well. The electronic controller is operatively connected to the transducer and is suitable for operation within the well, and is configured to generate the ultrasonic signals for transmission by the at least one transducer. The tool is useful in either open- or cased-hole environments. Two particular applications are inspection of casing thickness and cement bond quality in a cased well. Open hole applications include, but are not limited to, formation stability, imaging and characterization.

In particular embodiments, the at least one transducer is suitable for simultaneously transmitting an ultrasonic signal comprising encoded pulses and receiving those encoded pulses as echo pulses reflected from surfaces in the well during operation of the well logging tool. In certain embodiments, differences in travel time indicate the distances to the inside and outside surfaces of the casing, while differences in amplitude indicate the cement bond quality.

In particular embodiments, the emitted signal comprises encoded pulses. In certain embodiments, the encoding of the pulses comprises frequency modulation, such as FM chirping, while in other embodiments, pulses are encoded using phase modulation.

In particular embodiments, the at least one transducer comprises a separate but substantially parallel piezoelectric transmitter and receiver pair (or pairs). In certain of these embodiments the transmitter and receiver pair are radially symmetric. In certain of these embodiments, a central, disk-shaped element is surrounded by a ring-shaped receiver, one being the transmitter and the other the receiver.

In particular embodiments the tool further comprises electronics within the housing adapted to convert the received echo pulses into reduced data files, including casing surface data, casing thickness, and cement bond quality, down-hole, rather than transmitting the raw data up-hole for processing. In certain embodiments, the raw data is stored in the tool for up-hole processing, either in stead of or in addition to down-hole processing.

Also disclosed are methods of determining properties of the down-hole environment, including, for example, surface data, casing thickness, and cement bond quality.

BRIEF DESCRIPTION OF THE DRAWINGS

FIG. 3 shows an intermediate stage of a process for making an emitter/receiver pair, in which the piezoelectric element has been coupled to a face plate and a first electric lead attached.

FIG. 5A shows a still later stage of a process for making an emitter/receiver pair, in which the face plate has been inserted into the end of a cylinder with a shoulder edge.

FIG. 5B shows a close-up of the shoulder edge, its interface with the face plate, and an epoxy layer covering the face plate, shown in FIG. 5A.

DESCRIPTION OF THE ILLUSTRATED EMBODIMENTS

Figure 1:
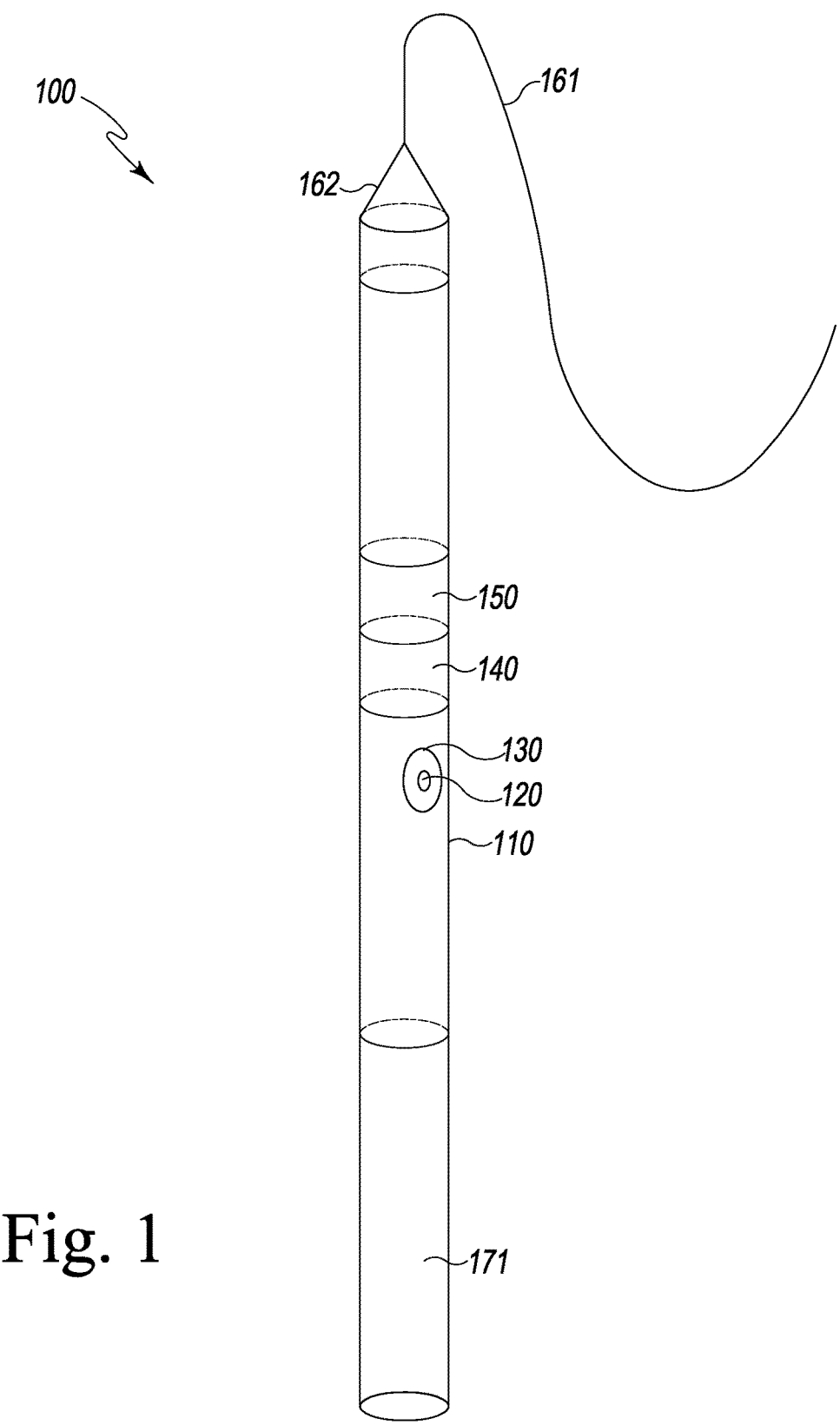
FIG. 1 is an illustration of an embodiment of a well-logging tool string.

For the purposes of promoting an understanding of the principles of the disclosure, reference will now be made to the embodiment illustrated in the drawings, and specific language will be used to describe the same. It will nevertheless be understood that no limitation of the scope of the claims is thereby intended, and alterations and modifications in the illustrated device, and further applications of the principles of the disclosure as illustrated therein, are herein contemplated as would normally occur to one skilled in the art to which the disclosure relates.

FIG. 1 illustrates one embodiment of a well logging tool disclosed herein, indicated generally at 100, and shown as a part of a larger tool string. The well-logging tool comprises a housing 110, a sonic emitter 120, a sonic receiver 130, an electronic controller 140, and a power supply 150. As will be familiar to those skilled in the art of well logging, the tool 100 is adapted to be inserted into a well bore, and is therefore adapted for insertion into the downhole environment of a well. Because of the physical constraints of the well bore, the housing 110 is typically cylindrical in shape, with a diameter small enough to allow it easy ingress into most or all standard well casing, taking into account the radius of curvature of the well at its tightest points. Thus, the housing is advantageously less than about 6 inches in diameter, and advantageously as small as about 2 inches in diameter.

The housing 110 provides pressure and fluid seals that protect the internal electronics and power elements from infiltration of fluid and from the pressure of the down-hole environment. The tool 100 is introduced into the well at the end of a "wireline" 161 or cable; typically, the cable provides both the mechanical means for lowering and raising the tool in the well and also the electric and/or electronic connection for receiving telemetry from the tool during logging. Typically, the wireline 161 is attached to a roughly conical "head" 162, where the tool interfaces with internal wires in the cable 161 to communicate with the surface during well logging. The head 162 also typically contains a weak point, which is chosen to assure that it, rather than the cable, breaks if the tool becomes stuck and too much force is applied. The head 162 thus provides both a mechanical and electrical connection with the surface. The head is attached mechanically with the housing 110, typically using both threads, to provide for firm transmission of tension from above, and gaskets, to seal the interior of the housing 110 against external pressure. It will be appreciated, however, that any suitable means of transmitting mechanical force and sealing against pressure may be used. The housing 110 may also optionally be adapted, by threading or other means, for attachment with other well logging tools, such as the tool 171 illustrated in FIG. 1, to form a tool string to facilitate simultaneous logging of other aspects of the downhole environment, as will be familiar to those skilled in the art of well logging. (In such embodiments, the housing 110 also advantageously contains a bus that transmits information from tools in the tool string, including tools below the tool 100, up the string, and then through the head 162 and wireline 161, to allow real-time monitoring during logging.)

The sonic emitter 120 and receiver 130 are disposed within the housing, and are adapted to emit and receive, respectively, encoded ultrasonic signals having a frequency greater than about 3 MHz. In certain embodiments the emitter 120 and receiver 130 are adapted to emit and receive, respectively, encoded ultrasonic signals with a bandwidth greater than 3 MHz. The electronic controller 140, supplied with power from the power supply 150, drives the emitter 120 with a waveform so as to generate an encoded ultrasonic pulse. Ultrasonic pulses reflected from well casing inner and outer surfaces are received by receiver 120, which generates a voltage waveform in response to the received sound waves. The controller 140 can correlate the received waveform to the encoded transmitted pulse and generate time and energy content for each received echo pulse. From time and energy content the controller can determine the distance from the tool to the casing, the casing thickness, and the nature of the material interfaced to the casing outer wall (e.g. cement bond quality). For example, the rate of decay in the successive echoes from internal reflections within the casing can be used to determine the cement bond quality. These calculated values consume a small fraction of the storage space needed to hold the original echo waveforms, and can be stored to memory or transmitted uphole for later processing.

The encoded signal produced by the emitter 120 can employ a pulse compression algorithm. Any suitable pulse compression algorithm can be employed, such as continuous frequency modulation (FM-chirp), pulse-coded phase modulation, or pulse-coded frequency modulation. FM-chirp involves a fixes duration sinusoidal waveform that begins as one frequency and sweeps over time to another frequency. The rate of shift can follow nearly any mathematical relationship; in linear FM chirp, the slope of the frequency is a straight line.

It is desirable to measure casing thickness with a resolution of about 1 mm. Spatial resolution is a function of signal bandwidth, and has the relationship:

$$\rho \approx c/2B \tag{1}$$

where:
ρ=spatial resolution
c=speed of sound
B=signal bandwidth

Given a speed of sound in steel, about 6,100 m/s, the desired resolution can be achieved with a bandwidth of about 3 MHz.

A typical downhole transducer is typically capable of providing a bandwidth of about 60%, so a transducer capable of providing sufficient bandwidth will typically have a center frequency of about 5 MHz, a lower frequency performance limit (the lower frequency at which the transducer has half of its maximum performance) of about 3.5 MHz, and an upper frequency performance limit of about 6.5 MHz. In certain embodiments, the transducer has a higher ratio of bandwidth-to-frequency, and the center frequency can be lower, for example 2.5 HMz. An advantageous encoded drive pulse will cause emitter 120 to generate an ultrasonic waveform containing these frequencies in order to enable measurements with resolution on the order of 1 mm.

Attenuation is typically frequency dependent, and drilling muds, and especially heavy drilling muds, are highly attenuative. Therefore, it is typically necessary to use substantially lower frequencies—typically on the order of kilohertz. Conversely, logging tools that do use higher frequencies are unsuitable for use in heavy drilling muds. For example, Schlumberger's Ultrasonic Casing Imager ("UCI") has a transducer frequency of 2 MHz, and even that is too high for reliable operation in a highly attenuative environment; it is recommended that the UCI be used only in brine, oil, or very light muds.

It will be appreciated that the tool 100 may also emit signals with lower frequencies, either via sonic emitter 120, or via other transducers specifically adapted for that purpose, as long as the total bandwidth is sufficient to achieve the desired resolution.

It will be appreciated that one goal is to keep the total instantaneous power low enough to be easily achievable with down-hole electronics. In acoustic applications using drilling mud as a medium, it is typically necessary to use an emitter drive voltage of several hundred volts in order to deliver sufficient energy a relatively small number of acoustic cycles, such that the returned echo pulses can be detected with a sufficient signal-to-noise ratio. An encoded pulse is therefore advantageously employed, which is longer, and, therefore, can contain sufficient energy for a sufficient signal-to-noise ratio using lower emitter drive voltage and commensurately lower instantaneous power. In particular, the emitter can be operated using substantially less than 250V. In certain embodiments the receiver and emitter are operated using a 110V signal; in certain other embodiments they are operated using a 24V signal.

In certain embodiments the pulse duration is approximately 60 μs, with an instantaneous transmit power of approximately 16.7 mW. This translates into a total power-per-pulse of about 1 μJ, and, thus, if the amount of energy in the received signal is frequency independent, provides a signal-to-noise ratio in the received signal approximately equal to a standard signal transmitted at about 3 MHz emitted at about 3.3 W.

Ultrasonic waves incident on a surface striking the surface at a given angle (relative to normal) will reflect from the surface at a reciprocal angle. An ultrasonic emitter is therefore ideally positioned to direct sonic pulses exactly normal to the target, with a receiver occupying the same position, such that the maximum amount of energy transmitted by the emitter is reflected from the target to the receiver. This can be accomplished by using the same element as both the emitter and the receiver in two discrete time periods ("pulse echo" operation). In pulse-echo operation the element is first driven with a voltage wave form causing the element to emit a sound wave, then the element is removed from the transmitter circuit and connected to an amplifier circuit and, at such time as a sound wave impinges on the element, a voltage signal is generated and can be measured and processed. Application of pulse echo operation presents engineering challenges when using an encoded transmit signal, since the length of the transmit signal can be so long that the leading edge of the train of pulses can leave the tool, encounter the casing surfaces, and return before the trailing edge of the train of pulses has been generated. This is further complicated by the time required by the element to quiet after emitting before it is ready to receive. Should a target be too close to the element, a reflected sound wave will reflect back to the element before the element is connected to the receive amplifier and is ready to act as a receiver. The maximum spacing between the emitter and the target is constrained by the size of the borehole, and, in any event, due to the high attenuation of drilling mud, it is desirable to keep the ultrasonic emitter in close proximity to the casing to limit energy loss. (The spacing may be less than 1 inch, and is advantageously less than 0.5 inch.)

One solution is to heavily dampen the element to reduce time lost between the transmit and receive modes. Lead metaniobate piezoelectric elements, for example, are suitable for this purpose. This dampening generally reduces transmit power and lowers sensitivity, and even where these trade-offs are acceptable, can add only a finite time to the cycle. An alternative technique is to space the element from the target with a medium that has a slow speed of sound (a delay line), as it will increase the time it takes for the emitted pulse train to traverse the distance available. Because the speeds of sound in various materials are not arbitrarily small, and slower speeds of sound tend to come with higher lossiness, this too can add only finite time to the cycle.

An alternative approach is to employ separate emitter and receiver elements ("pitch-catch"). In pitch-catch the emitter only acts to transmit and the receiver element only acts to detect, and both can perform their functions simultaneously. The transmitter element can therefore continue to transmit signals of arbitrary length. The preferred geometry of the emitter and receiver in relation to the target differs from pulse echo applications, however. Energy transmitted by the emitter will not reflect from the target and strike the receiver if the elements are not precisely located at equal angles from the direction normal to the target. Unless the emitter and receiver are a known distance from the target, achieving this requires knowing the distance between the elements and the target. This is extremely difficult in oil well casing measurement applications, despite the possible use of centralizers or stand-offs, since the emitted and reflected signal is highly directional.

A separate emitter 120 and receiver 130 are therefore advantageously arranged in such a way as to minimize the distance between the elements, and furthermore, to position them so that returned signal is robust to small variations in the angle of incidence on the target. Thus, a separate emitter 120 and receiver 130 are advantageously interdigitated or intermingled.

Figure 2A:
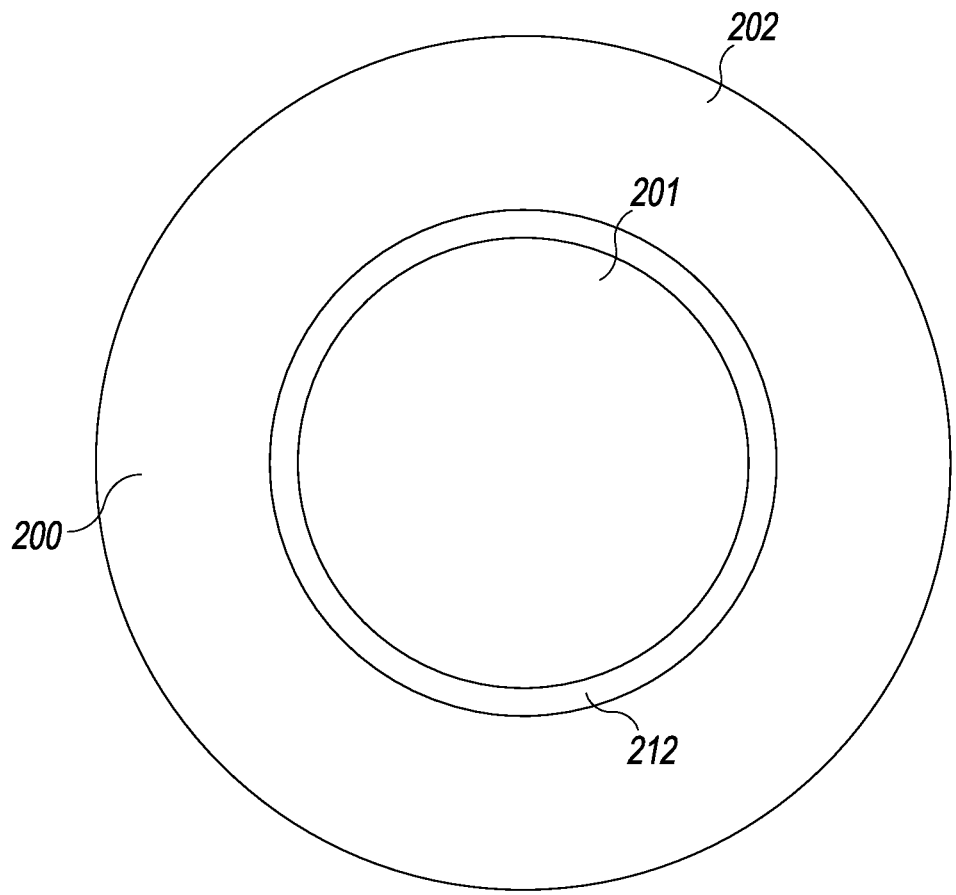
FIG. 2A shows a plan view of a piezoelectric element suitable for incorporation as an emitter/receiver pair in a first embodiment tool for high-frequency inspection of the downhole environment.
Figure 2B:
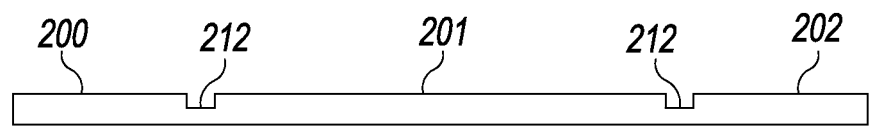
FIG. 2B shows a side view of the piezoelectric element of FIG. 2A.

This can be achieved, for example, by using a concentric (radially symmetric) arrangement of the emitter 120 and receiver 130. FIG. 2 illustrates an advantageous arrangement for an emitter 120 and receiver 130 pair. Alternatively, bilateral symmetry can be employed, for example with a central emitter flanked by a pair of receivers to either side.

In particular embodiments, an emitter 120 and receiver 130 are made from a single, circular piezoceramic element as follows. An element 200 with a diameter of 0.6" and thickness of about $\frac{1}{80}^{th}$ of an inch is partially etched at a diameter of about 0.34 to produce a cut 212 that divides the element 200 into an inner area 201 and an outer area 202. The element 200 is, in certain embodiments, a K-81, a lead metaniobate piezoelectric element available from Piezo Technologies. The inner area 201 can be used as the emitter 120, and the outer area 130 can be used as the receiver 130. It will be appreciated that the total area of the inner area, when the cut 212 has a diameter of about 0.34 inches, is about half the area of the outer area 202. The emitter 120 and receiver 130 can be reversed, but in that case the diameter of the cut 212 is advantageously increased, so as to increase the area of the receiver 130.

Figure 4:
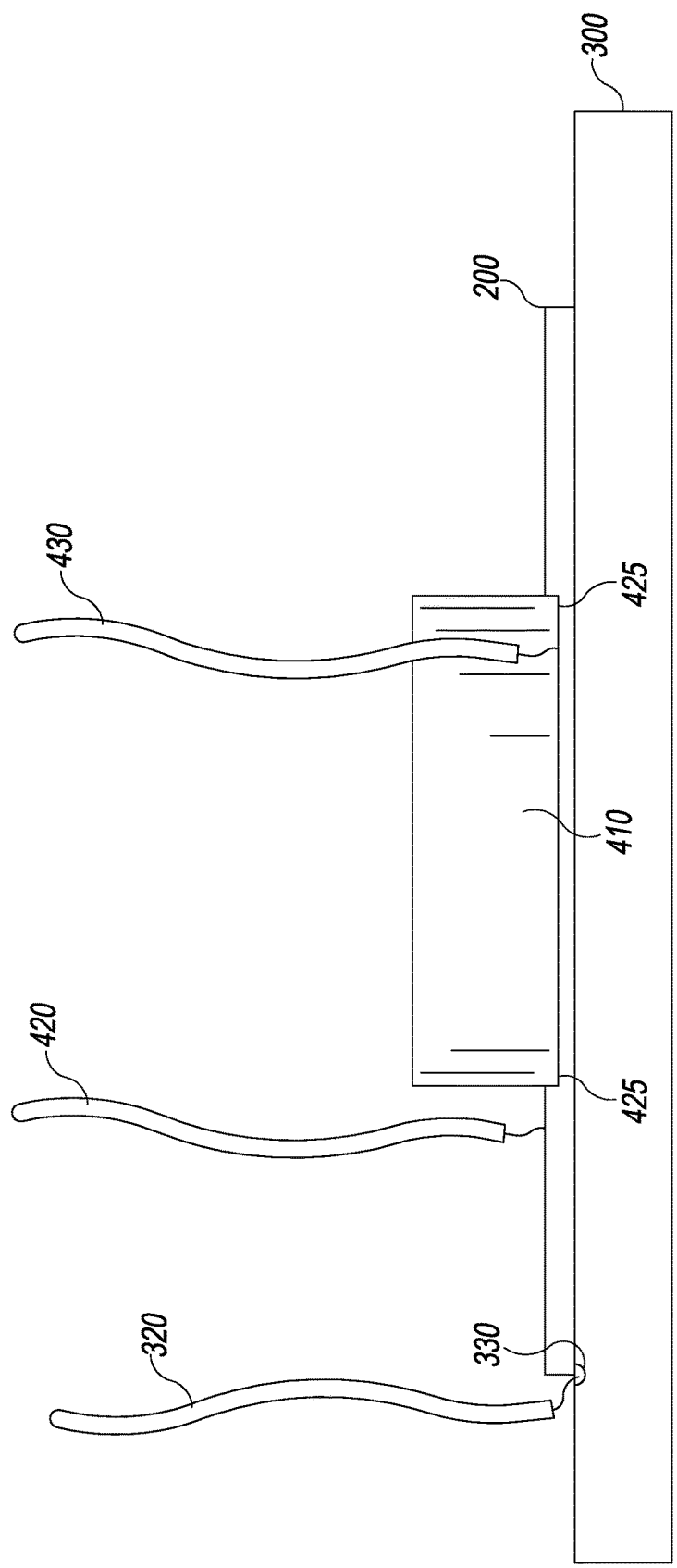
FIG. 4 shows a later state of a process for making an emitter/receiver pair, in which inner and outer regions on the piezoelectric element have been isolated with a dam, and a second and third electric leads affixed.

As shown in FIG. 3, the element 200 is advantageously coupled with a face plate 310. Aluminum can be used for the face plate 310, since it has a very similar acoustic impedance (18 vs. 19 for the K-81), has a high speed of sound (6400 m/s), and is easily machined. It is highly subject to corrosion, however, and therefore needs to be well-sealed. Alternatively, the face plate 310 can be made of another material. In certain of these embodiments, the face plate 310 has a thickness 318 of about 0.032 inch, and a diameter 315 of about 0.75 inch. In certain embodiments the element 200 is bonded directly to the face plate 310. In other embodiments, the element 200 is oil-coupled to reduce stresses such as thermal coefficient of expansion mismatch. The cut 212 is advantageously made after the element 200 is coupled to the face plate 310. A first electric coupling 320 is advantageously made via a hole or divot 330 in the backing 310, located at the perimeter of the element 200. (The coupling 320 can be sealed in place via epoxy.) As shown in FIG. 4, an isolation dam 410 is affixed, for example by epoxy, to separate the emitter 120 and receiver 130, and a second and third electrical couplings 420 and 430 are attached to the outer area 130 and inner area 120, respectively, by the same epoxy. In certain embodiments, the first coupling 320 is used as ground, the second coupling as positive, and the third coupling as negative.

As shown in FIGS. 5A and B, the assembly of the element 200, the face plate 310, and the isolation dam 410 is advantageously placed in an outer housing 510, for example a polyetheretherketone ("PEEK") tube. The face plate 310 is advantageously fitted against a shoulder 515 in the inside edge of the housing 510 to securely hold the backing at a fixed depth 518, which is greater than the thickness 318 of the face plate 310. An epoxy layer 520 can be placed on the face plate 310, in the hollow formed by this difference in thickness, i.e., flush with the end wall 535 of the housing 510. In certain embodiments, the difference between depth 518 and thickness 318 is about 0.008 inch.

Figure 6:
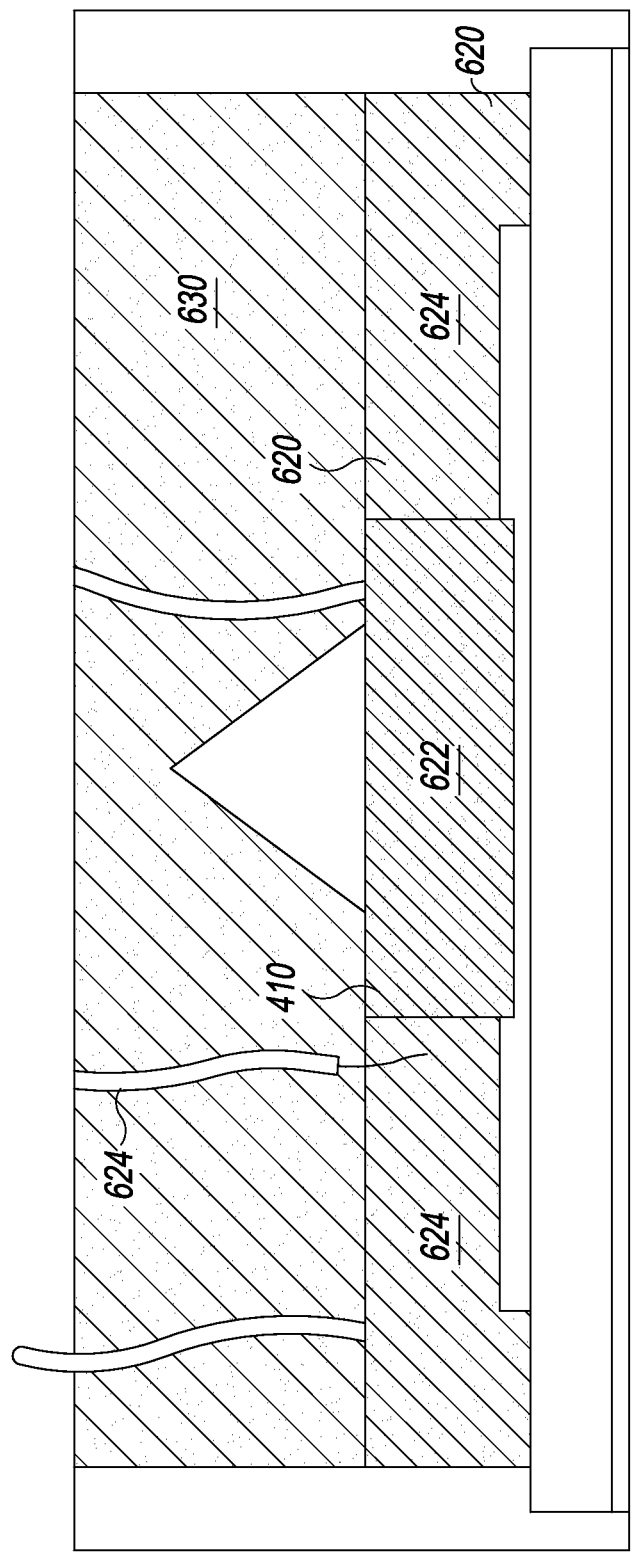
FIG. 6 shows a completed acoustic element, comprising an emitter and a receiver, and suitable for incorporations in a first embodiment tool for high-frequency inspection of the down-hole environment.

As shown in FIG. 6, the area inside the isolation dam 410 is filled, for example with a loaded epoxy, to form a main backing 620. The main backing 620 advantageously has two portions, a central region 622, and a surrounding region 624. In certain embodiments, the central region 622 has an acoustic impedance of 18, and the surrounding region 624 has an acoustic impedance of about 9. The volume between the isolation dam 410 and the housing 510 is filled with a lighter, second backing 630. In certain embodiments, the acoustic impedance of the second backing is about 5.

In operation, the emitter 120 may emit simple or encoded pulse trains.

The United States patent application entitled "Time of Flight Through Mud," naming Pulley as inventor and filed on the same day as this application, is incorporated herein in its entirety.

While certain embodiments have been illustrated and described in detail in the drawings and foregoing description, the same is to be considered as illustrative and not restrictive in character. All changes and modifications that come within the spirit of the claims are desired to be protected. Features or attributes noted with respect to one or more specific embodiments may be used or incorporated into other embodiments of the structures and methods disclosed.

What is claimed is:

1. A well logging tool, comprising:
a housing suitable for insertion into a well, wherein the well has a casing and a cement bond on an outer surface of the casing;
at least one transducer disposed within the housing and suitable for transmitting encoded ultrasonic signals having a bandwidth greater than 3 MHz and a frequency centered above 2.5 MHz into fluid surrounding the well logging tool while the well logging tool is disposed within the well, wherein the at least one transducer is suitable for both transmitting an ultrasonic signal comprising encoded pulses and receiving those encoded pulses as echo pulses reflected from surfaces in the well during operation of the well logging tool; and
an electronic controller operatively connected to the transducer and suitable for operation within the well, the electronic controller configured to cause the transducer to generate the ultrasonic signals;
wherein the controller is configured to correlate at least one echo pulse of the ultrasonic signal with an emitted signal to determine at least one of the set consisting of variations in a surface of the well casing and the quality of a cement bond on an outer surface of the casing;
wherein the controller is configured to correlate differences in amplitude of echo pulses to determine variations in cement bond quality;
wherein the differences in amplitude are used to determine a rate of decay of reverberations in the casing.

2. The well logging tool of claim 1,
wherein the controller resolves variations in the surface of the well casing with a spatial resolution of about 1 mm.

3. The well logging tool of claim 1,
wherein the controller is configured to determine differences in the time of flight of echo pulses reflected from different surfaces to determine the variations in the thickness of the casing.

4. The well logging tool of claim 1,
wherein the encoded pulses are encoded using frequency modulation.

5. The well logging tool of claim 1,
wherein said encoded pulses are chirped.

6. The well logging tool of claim 1,
wherein the at least one transducer comprises a single, rapid-damping piezoelectric element that both sends the ultrasonic signals and receives echo pulses of those signals.

7. The well logging tool of claim 1,
wherein the at least one transducer comprises a transmitter and receiver pair that are parallel with one another.

8. The well logging tool of claim 7,
wherein the transmitter is positioned between at least two receiver regions on opposite sides of the transmitter.

9. The well logging tool of claim 8,
wherein the transmitter and receiver pair are radially symmetric.

10. A well logging tool comprising:
a housing suitable for insertion into a well;
at least one transducer disposed within the housing and suitable for transmitting encoded ultrasonic signals having a bandwidth greater than 3 MHz and a frequency centered above 2.5 MHz into fluid surrounding the well logging tool while the well logging tool is disposed within the well; and
an electronic controller operatively connected to the transducer and suitable for operation within the well, the electronic controller configured to cause the transducer to generate the ultrasonic signals;
wherein the at least one transducer comprises a transmitter and receiver pair that are parallel with one another;
wherein the transmitter is positioned between at least two receiver regions on opposite sides of the transducer;
wherein the transmitter and receiver pair are radially symmetric;
wherein the transmitter and receiver pair comprise a central, disk-shaped transmitter and a surrounding, ring-shaped receiver.

11. The well logging tool of claim 1 and additionally comprising:

electronics within said housing to convert received echo pulses into reduced data files including casing surface data, casing thickness, and cement bond quality.

12. The well logging tool of claim 1 and additionally comprising:
digital storage within said housing to store signals derived from echo pulses received by said transducer for periods of at least 30 minutes.

13. The well logging tool of claim 1,
wherein the center frequency is above about 3.5 MHz, and wherein the at least one transducer is concentrically arranged.

14. The well logging tool of claim 13,
wherein the center frequency is above about 4.5 MHz.

15. The well logging tool of claim 13,
wherein the bandwidth is greater than 4.5 MHz.

16. A method for determining at least one property of a cased well, comprising:
lowering a well logging tool into the cased well, the well logging tool having at least one transducer suitable for transmitting ultrasonic signals having a bandwidth greater than 3 MHz and a frequency centered above 2.5 MHz into fluid surrounding the well-logging tool while the well logging tool is disposed within a well, wherein the at least one transducer is suitable for both transmitting an ultrasonic signal comprising encoded transmitted pulses and receiving those encoded pulses as echo pulses reflected from surfaces in the well during operation of the well logging tool, and also having an electronic controller operatively connected to the transducer and suitable for operation within the well, the electronic controller configured to cause the transducer to generate the ultrasonic signals, wherein the controller is configured to correlate at least one echo pulse of the ultrasonic signal with an emitted signal to determine at least one of the set consisting of variations in a surface of the well casing and the quality of a cement bond on an outer surface of the casing and wherein the controller is configured to correlate differences in amplitude of echo pulses to determine variations in cement bond quality, wherein the differences in amplitude are used to determine a rate of decay of reverberation in the casing;
transmitting a series of encoded ultrasonic pulses into fluid surrounding the well logging tool using the transducer;
receiving a corresponding series of echo pulses; and
using the controller, correlating the transmitted pulses with the echo pulses to determine the at least one property.

17. The method of claim 16,
wherein the at least one transducer comprises a central transmitter and a concentrically arranged receiver.

18. The method of claim 16,
wherein the at least one transducer comprises a single, rapid-damping piezoelectric element that both transmits and receives ultrasonic pulses.

* * * * *